(12) United States Patent
Christensen

(10) Patent No.: US 12,271,883 B2
(45) Date of Patent: *Apr. 8, 2025

(54) SYSTEMS AND METHODS FOR DIRECT ELECTRONIC COMMUNICATION OF CONSUMER INFORMATION

(71) Applicant: Worldpay, LLC, Symmes Township, OH (US)

(72) Inventor: Coy A. Christensen, Scottsdale, AZ (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/417,013

(22) Filed: Jan. 19, 2024

(65) Prior Publication Data

US 2024/0161080 A1 May 16, 2024

Related U.S. Application Data

(63) Continuation of application No. 17/955,807, filed on Sep. 29, 2022, now Pat. No. 11,915,221, which is a continuation of application No. 17/303,258, filed on May 25, 2021, now Pat. No. 11,488,132, which is a continuation of application No. 16/802,831, filed on Feb. 27, 2020, now Pat. No. 11,049,087, which is a
(Continued)

(51) Int. Cl.
*G06Q 20/24* (2012.01)
*G06Q 20/10* (2012.01)
*G06Q 20/20* (2012.01)
*G06Q 20/40* (2012.01)
*G06Q 20/26* (2012.01)

(52) U.S. Cl.
CPC ......... *G06Q 20/204* (2013.01); *G06Q 20/102* (2013.01); *G06Q 20/401* (2013.01)

(58) Field of Classification Search
CPC .. G06Q 20/204; G06Q 20/102; G06Q 20/401; G06Q 20/202; G06Q 20/38215; G06Q 20/027
USPC .......................................................... 705/17
See application file for complete search history.

(56) References Cited

U.S. PATENT DOCUMENTS 8,117,125 B1 * 2/2012 Kawan ................. G06Q 20/102
705/40
2012/0330769 A1 * 12/2012 Arceo ................ G06Q 20/4014
455/411

* cited by examiner

*Primary Examiner* — Garcia Ade
(74) *Attorney, Agent, or Firm* — Bookoff McAndrews, PLLC

(57) ABSTRACT

A method for submission of payment transaction requests from a point of sale (POS) terminal to a financial institution includes reading payment information from a payment vehicle, reading financial institution routing information from the payment vehicle, reading a payment vehicle certificate from the payment vehicle, requesting consumer authentication information from a consumer, and submitting a payment transaction request to the financial institution using the financial institution routing information, a POS terminal certificate, and the payment vehicle certificate. An authentication certificate for submission of payment transaction requests from a point of sale (POS) terminal to a financial institution may be generated by receiving a request for an authentication certificate from a requestor, the request comprising a requestor ID and one or more capabilities of the requestor, verifying the requestor ID, generating an authentication certificate for the requestor, and returning the generated authentication certificate to the requestor.

20 Claims, 9 Drawing Sheets

Related U.S. Application Data continuation of application No. 15/353,350, filed on Nov. 16, 2016, now Pat. No. 10,621,568.

| | | |
|---|---|---|
| 305 | SERIAL NUMBER | USED TO UNIQUELY IDENTIFY THE CERTIFICATE. |
| 310 | SUBJECT | THE PERSON, OR ENTITY IDENTIFIED. |
| 315 | SUBJECT DATA | ADDITIONAL DATA PERTAINING TO THE SUBJECT. |
| 320 | SIGNATURE ALGORITHM | THE ALGORITHM USED TO CREATE THE SIGNATURE. |
| 325 | SIGNATURE | THE ACTUAL SIGNATURE TO VERIFY THAT IT CAME FROM THE ISSUER. |
| 330 | ISSUER | THE ENTITY THAT VERIFIED THE INFORMATION AND ISSUED THE CERTIFICATE. |
| 335 | VALID-FROM | THE DATE THE CERTIFICATE IS FIRST VALID FROM. |
| 340 | VALID-TO | THE EXPIRATION DATE. |
| 345 | KEY-USAGE | PURPOSE OF THE PUBLIC KEY (E.G. ENCIPHERMENT, SIGNATURE, CERTIFICATE SIGNING, ETC.). |
| 350 | PUBLIC KEY | THE PUBLIC KEY. |
| 355 | FINGERPRINT ALGORITHM | THE ALGORITHM USED TO HASH THE PUBLIC KEY CERTIFICATE. |
| 360 | FINGERPRINT | THE HASH ITSELF, USED AS AN ABBREVIATED FORM OF THE PUBLIC KEY CERTIFICATE. |

*FIG. 3*

SYSTEMS AND METHODS FOR DIRECT ELECTRONIC COMMUNICATION OF CONSUMER INFORMATION

CROSS-REFERENCE TO RELATED APPLICATION(S)

This patent application is a continuation of and claims the benefit of priority to U.S. application Ser. No. 17/955,807, filed on Sep. 29, 2022, which is a continuation of U.S. application Ser. No. 17/303,258, filed on May 25, 2021, now U.S. Pat. No. 11,488,132, which is a continuation of U.S. application Ser. No. 16/802,831, filed on Feb. 27, 2020, now U.S. Pat. No. 11,049,087, which is a continuation of U.S. application Ser. No. 15/353,350, filed on Nov. 16, 2016, now U.S. Pat. No. 10,621,568, the entireties of which are incorporated herein by reference.

TECHNICAL FIELD

The present disclosure relates generally to the field of payment transactions and, more particularly, to direct electronic submission of consumer information from a merchant payment device to a transaction server of a financial institution by way of a computer network.

BACKGROUND

Traditionally, merchants and other store owners have point of sale (POS) terminals and POS systems that can accept check or payment card payments from consumers for goods and services. Merchants typically contract with an acquirer processor to process payment transactions originating from the merchant's POS terminals and POS systems. Acquirer processors process the payment transactions and settle funds between consumers' and merchants' accounts. Online vendors accept bank and payment card payments from Internet customers and can process those payments using services provided by payment network providers, such as acquirer processors. Utilities, service providers, and other online parties similarly accept bank transfers and accept payments from payment cards using similar services provided by payment network providers.

However, such processing methods rely on complex communications among multiple entities in order to process a transaction without taking advantage of a ubiquitous modern technology infrastructure. Relevant modern technology includes digital communications and payment data technology.

With respect to digital communications, networking infrastructure has improved and high-speed networks, such as Ethernet and the Internet, have become so widely available at such low cost that the majority of merchants now have high speed connectivity within their merchant locations. With higher speeds comes the ability to transfer much larger files. Original credit card data files were sized to be able to run on 2400 baud modems and were only a few hundred bytes long. New internet speeds run multiple magnitudes faster and transmitting a megabyte of data can quickly be done.

With respect to payment data technology, the increasing prevalence of mobile and Smart Card (EMV) solutions suggests that the simple magnetic stripe card may soon be obsolete. Modern payment devices can carry applications running on them in addition to consumer payment information and may provide further expanded functionality. Even these modern solutions are well established, suggesting that new options are available that could be used to store the consumers account information.

Accordingly, there is a need for new methods of processing electronic payment transactions that take advantage of modern technology infrastructure, decrease costs for merchants and financial institutions, and improve convenience for consumers.

SUMMARY

According to certain aspects of the present disclosure, systems and methods are disclosed for submission of payment transaction requests from a point of sale (POS) terminal to a financial institution.

In one embodiment, a computer-implemented method is disclosed for submission of payment transaction requests from a point of sale (POS) terminal to a transaction server of a financial institution. The method includes: reading payment information from a payment vehicle by way of a payment device connected to the POS terminal, reading financial institution routing information from the payment vehicle by way of the payment device connected to the POS terminal, reading a payment vehicle certificate from the payment vehicle by way of the payment device connected to the POS terminal, requesting consumer authentication information from a consumer, receiving the consumer authentication information from the consumer by way of a user input device connected to the payment device, and submitting a payment transaction request to the transaction server of the financial institution over a computer network using the financial institution routing information, a POS terminal certificate, and the payment vehicle certificate.

In an alternative embodiment, a computer-implemented method is disclosed for submission of payment transaction requests from a point of sale (POS) terminal to a transaction server of a financial institution. The method includes: receiving a request for a financial institution certificate from an authentication service, transmitting the financial institution certificate to the authentication service for validation, receiving, over a computer network, from a point of sale (POS) terminal a payment transaction request including payment information, a POS terminal certificate, and a payment vehicle certificate, and processing the payment transaction request according to the received payment information.

In accordance with another embodiment, a system is disclosed for submission of payment transaction requests from a point of sale (POS) terminal to a transaction server of a financial institution. The system comprises: a memory having processor-readable instructions stored therein; and a processor configured to access the memory and execute the processor-readable instructions, which when executed by the processor configures the processor to perform a plurality of functions, including functions to: read payment information from a payment vehicle by way of a payment device connected to the POS terminal, read financial institution routing information from the payment vehicle by way of the payment device connected to the POS terminal, read a payment vehicle certificate from the payment vehicle by way of the payment device connected to the POS terminal, request consumer authentication information from a consumer, receive the consumer authentication information from the consumer by way of a user input device connected to the payment device, and submit a payment transaction request to the transaction server of the financial institution over a computer network using the financial institution routing information, a POS terminal certificate, and the payment vehicle certificate.

In an additional embodiment, a computer-implemented method is disclosed for generating an authentication certificate for submission of payment transaction requests from a point of sale (POS) terminal to a financial institution. The method includes: receiving a request for an authentication certificate from a requestor, the request comprising a requestor ID and one or more capabilities of the requestor, verifying the requestor ID, generating an authentication certificate for the requestor, and returning the generated authentication certificate to the requestor.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

FIG. 3 depicts contents of an authentication certificate such as may be used for payment transaction request submissions, according to one or more embodiments.

DETAILED DESCRIPTION

Figure 1:
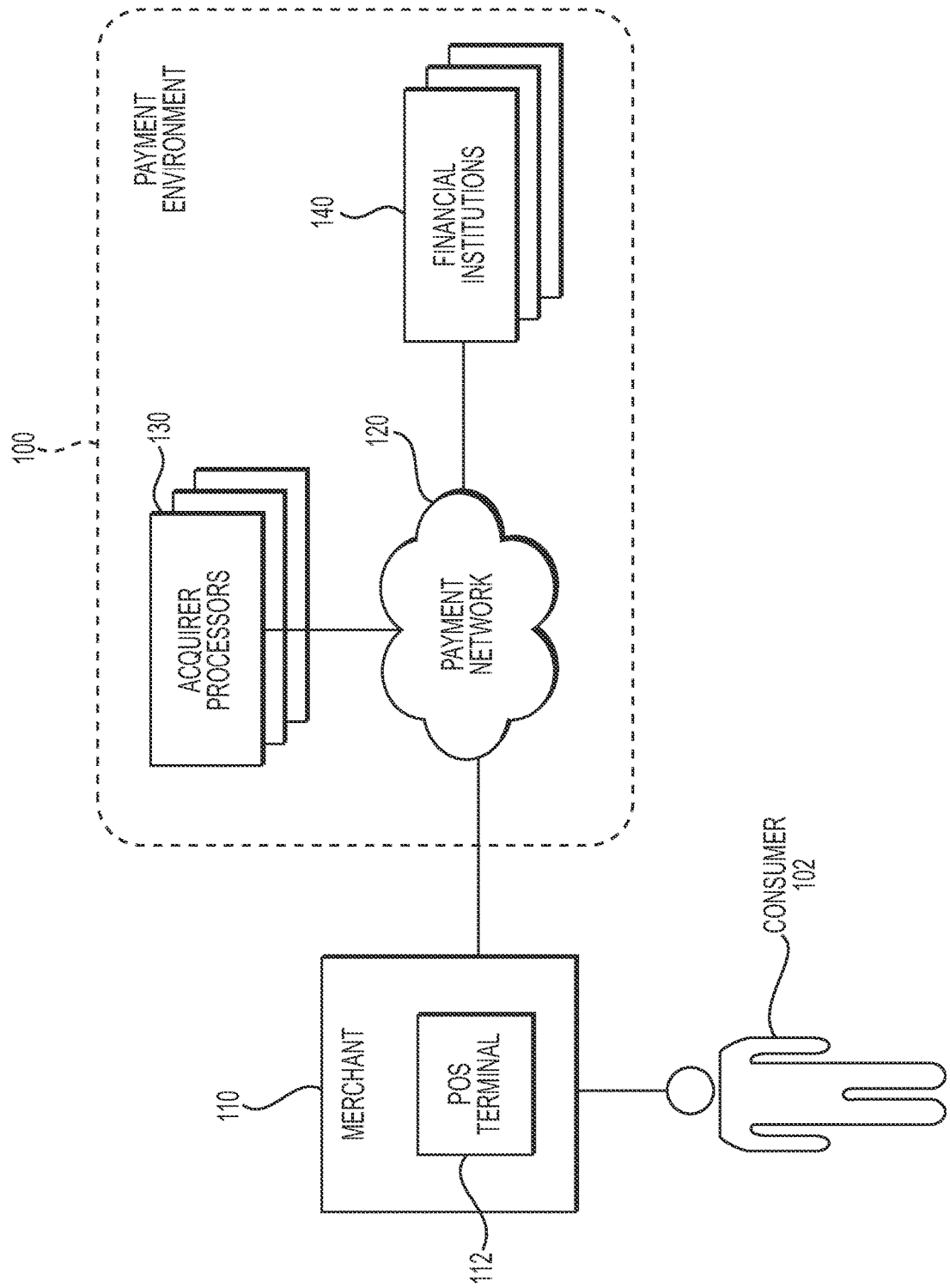
FIG. 1 depicts a block diagram of a traditional payment processing system.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for installing and managing point of interaction devices within a merchant environment.

As described above, existing methods and systems for electronic payment transaction processing rely on complex communications among multiple entities in order to process a transaction without taking advantage of a ubiquitous modern technology infrastructure. Thus, the embodiments of the present disclosure are directed to providing systems and methods for processing electronic payment transactions that take advantage of modern technology infrastructure.

For simplicity, the description that follows will be provided by reference to a "payment vehicle" or a "payment card," which generally refers to any type of alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Merchants use payment platforms, such as Point of Sale ("POS") terminals and POS systems, to accept payments from consumers in the form of cash, check, credit cards, and so forth. Although POS terminals and POS systems are the most common type of payment platforms, the term "payment platform" as used herein is intended to be construed broadly and would include systems for coupon redemption, and systems for implementing frequent use programs or customer loyalty programs, among other suitable transaction-based systems that require certification of their ability to correctly process transactions with other systems. Non-limiting examples of transaction-based systems could also include payment facilitators, ecommerce systems, mobile platforms, non-terminal POS solutions, and software solutions, such as those developed by independent software vendors, among other suitable transaction-based systems.

One or more examples of these non-limiting embodiments are illustrated in the selected examples disclosed and described in detail with reference to FIGS. 1-9 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Turning to FIG. 1, in a traditional payment processing system, a consumer 102, during the checkout process with a merchant 110, pays for goods or services from merchant 110 at a POS terminal 112. Consumer 102 may use a payment card as payment and the transaction is processed through a payment environment 100. Because merchant 110 generally can use a different bank or financial institution 140 than consumer 102, an acquirer processor 130 handles the financial transactions that transfer payment between the financial institution 140 of consumer 102 and that of merchant 110. Consumer 102 submits payment information at the POS terminal 112 of merchant 110, such as by swiping his or her payment card, inserting his or her chip-based payment card, through wireless near field communication (NFC), etc., or by any other suitable means. POS terminal 112 sends a payment request by way of a payment network 120 to an acquirer processor 130. Acquirer processor 130 requests an electronic transfer of funds from the received funds to the financial institution 140 associated with merchant 110.

Similarly, consumer 102 may purchase goods and services from online vendors, utilities, and service providers among other parties. Those parties' payment platforms may accept bank and payment card payments, as well as payments using third party payment providers, as would be understood by one of ordinary skill in the art. Example third party payment providers include, but are not limited to Apple Pay™ Android Pay™ and PayPal™ among other suitable third party payment providers. Consumers 102 also may pay for goods and services using a mobile app executing on a mobile computing device, such as an iPhone™ from Apple™ or an Android™ based smartphone.

Figure 2:
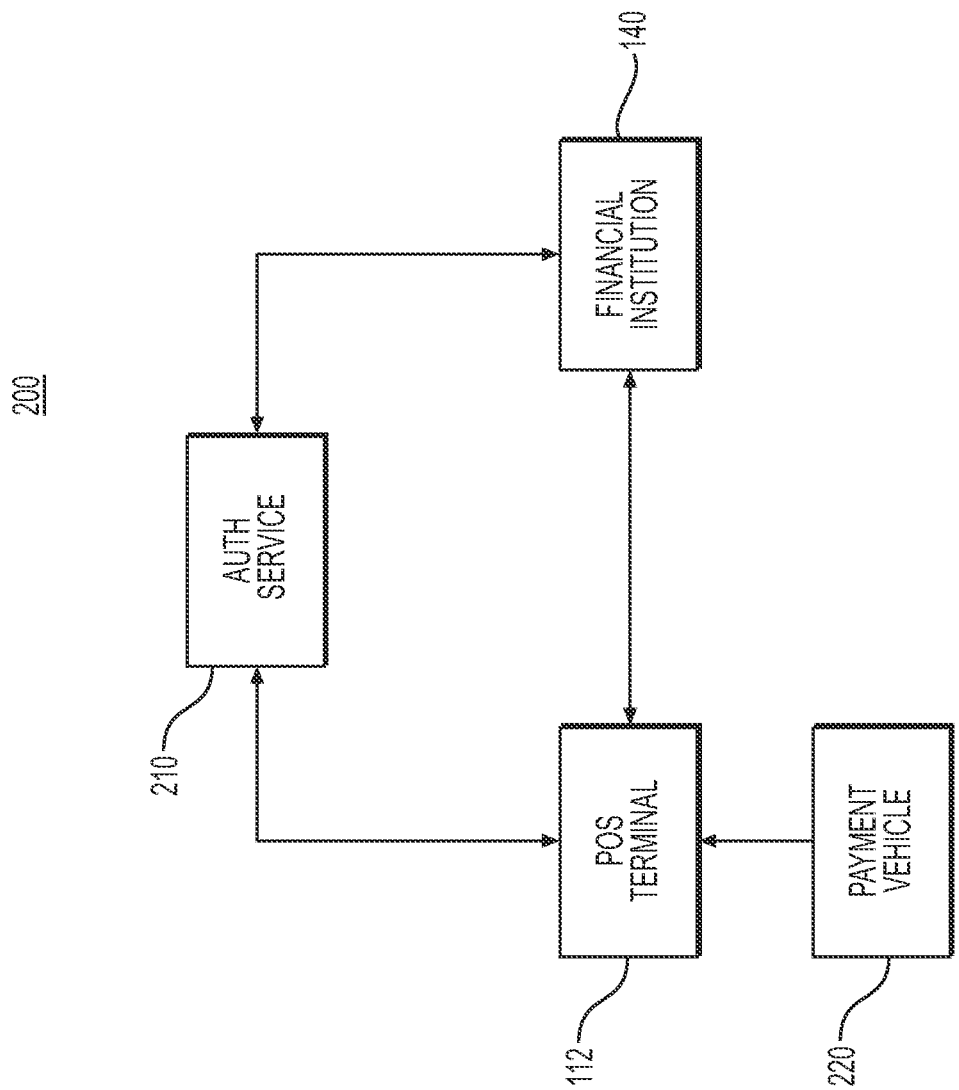
FIG. 2 depicts a block diagram of a system for payment transaction request submissions, according to one or more embodiments.

However, such traditional payment processing systems rely on complex communications among multiple entities in order to process a transaction. FIG. 2 depicts a system for payment transaction request submissions, according to one or more embodiments, that may allow for direct communication between a payment device, such as POS terminal 112 depicted in FIG. 1, and a financial institution, such as financial institution 140 depicted in FIG. 1.

As shown in FIG. 2, a payment vehicle 220, such as may be presented by consumer 102, may be in communication with POS terminal 112 by any suitable means such as, for example, swiping, insertion, proximity (in the case of NFC), etc. POS terminal 112, financial institution 140, and an authentication service 210 may be in electronic communication with each other over any suitable computer network such as, for example, a wired or wireless local area network, such as Ethernet, or a wide area network such as the Internet. Alternatively, these components may communicate via a cloud infrastructure. Communication among POS terminal 112, financial institution 140, and authentication service 210 may be secured by any suitable security means such as, for example, Secure Sockets Layer (SSL), Transport Layer Security (TLS), Internet Protocol Security (IPsec), etc. Communication among POS terminal 112, financial institution 140, and authentication service 210 may be directed to, among other things, transmitting identity information for payment vehicle 220, POS terminal 112, and financial institution 140 to authentication service 210, transmitting authentication certificates from authentication service 210 to POS terminal 112, financial institution 140, and other third parties, and transmitting payment transaction information and authentication certificates between POS terminal 112 and financial institution 140.

In the system depicted in FIG. 2, authentication service 210 may produce authentication certificates pertaining to POS terminal 112, financial institution 140, and payment vehicle 220. FIG. 3 depicts contents of an authentication certificate 300 such as may be used for payment transaction request submissions, according to one or more embodiments. As shown in FIG. 3, authentication certificate 300 may include, for example, serial number 305 used to uniquely identify the certificate, subject 310 specifying the person, or entity identified, subject data 315 specifying additional data pertaining to the subject, signature algorithm 320 specifying the algorithm used to create the signature, signature 325 encoding the actual signature to verify that it came from the issuer, issuer 330 specifying the entity that verified the information and issued the certificate, valid-from date 335 specifying the date the certificate is first valid from, valid-to date 340 specifying the expiration date, key-usage 345 specifying a purpose of the public key (e.g., encipherment, signature, certificate signing, etc.), public key 350 encoding the public key, fingerprint algorithm 355 specifying the algorithm used to hash the public key certificate, and fingerprint 360 encoding the hash itself, used as an abbreviated form of the public key certificate. Subject data 315 may specify additional capabilities or limitations of the identified subject. For example, subject data 315 may specify a maximum value per transaction, a maximum aggregate value among multiple transactions per merchant, per consumer, or per payment vehicle, a maximum frequency of transactions, a maximum number of transactions, etc. The maximum aggregate value, maximum frequency, and maximum number of transactions may be specified for various time periods. For example, the maximums may be per day, per hour, per minute, or per any other suitable time period. Furthermore, different time periods may be specified for different maximums. For example, the maximum frequency of transaction may be a certain number of transactions per hour and the maximum aggregate value may be for all transactions during the course of a day, and so forth.

Figure 4:
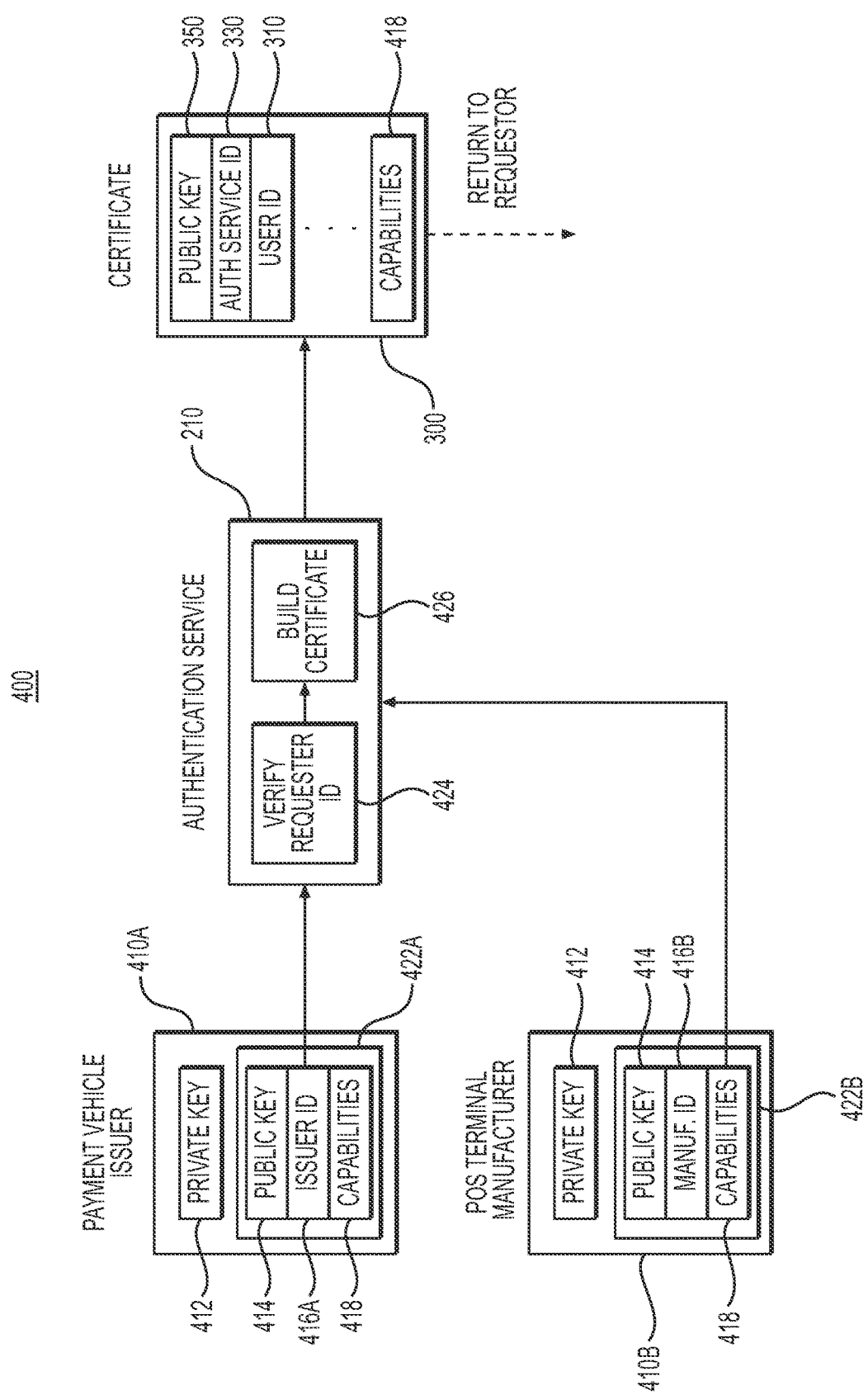
FIG. 4 depicts a process flow diagram of an example method for producing an authentication certificate, according to one or more embodiments.

An authentication certificate, such as authentication certificate 300, may be produced by authentication service 210. FIG. 4 depicts a process flow diagram of an example method for producing an authentication certificate, according to one or more embodiments. As shown in FIG. 4, a certificate requester 410, such as payment vehicle issuer 410A or POS terminal manufacturer 4106, may transmit an authentication certificate request 422 to authentication service 210. The requestor 410 may possess, among other things, a private encryption key 412, a public encryption key 414, a requester ID 416, such as issuer ID 416A or manufacturer ID 416B, and capabilities 418, which may include, for example, capabilities or limitations corresponding to subject data 315 in certificate 300. In some cases, private key 412 may not be transmitted to authentication service 210 with authentication certificate request 422, but may be held in secret by requestor 410.

Upon receiving authentication certificate request 422, authentication service 210 may verify the requestor ID 416 in operation 424. Upon verification of requestor ID 416, authentication service 210 may generate an authentication certificate 300 in operation 426 and return the generated authentication certificate 300 to requestor 410.

Figure 5:
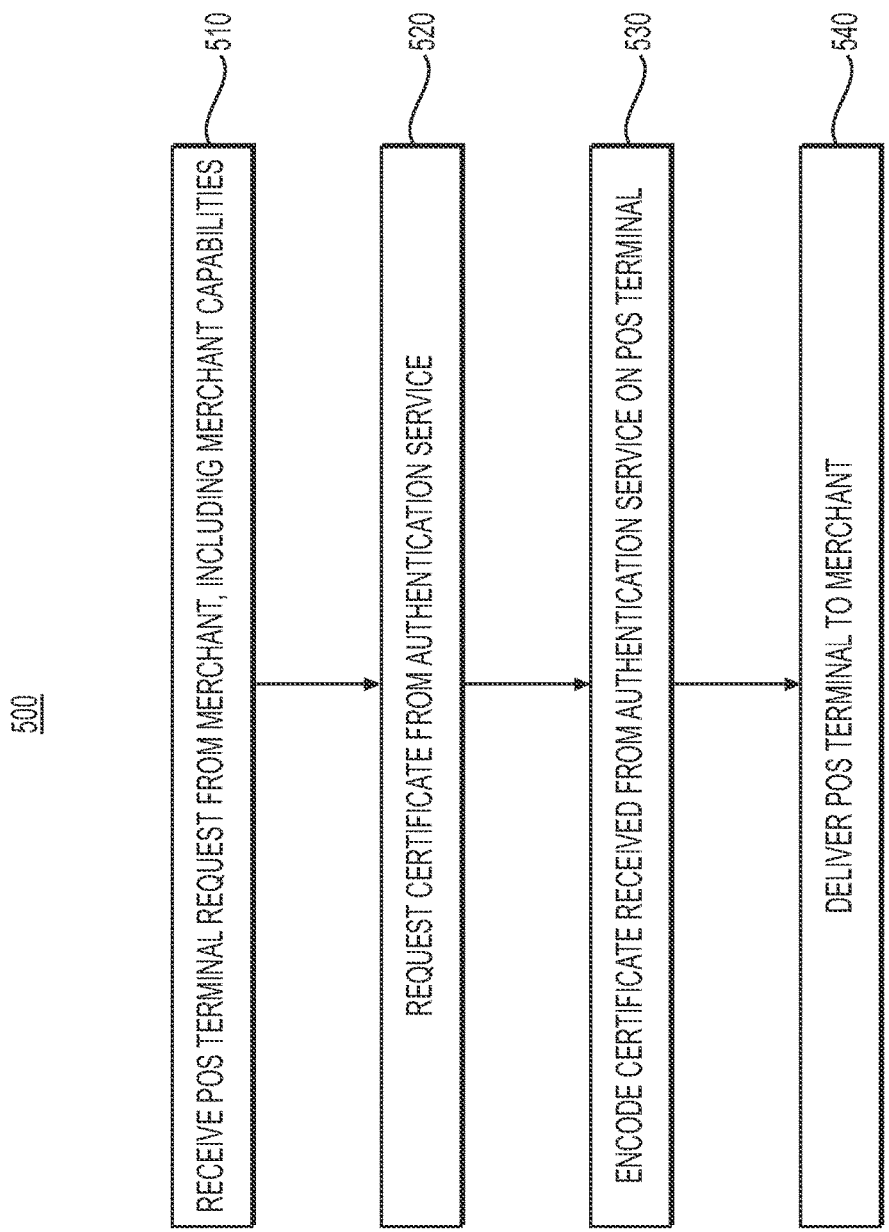
FIG. 5 is a flow chart depicting an example process for delivering an authenticated payment device to a merchant, according to one or more embodiments.
Figure 6:
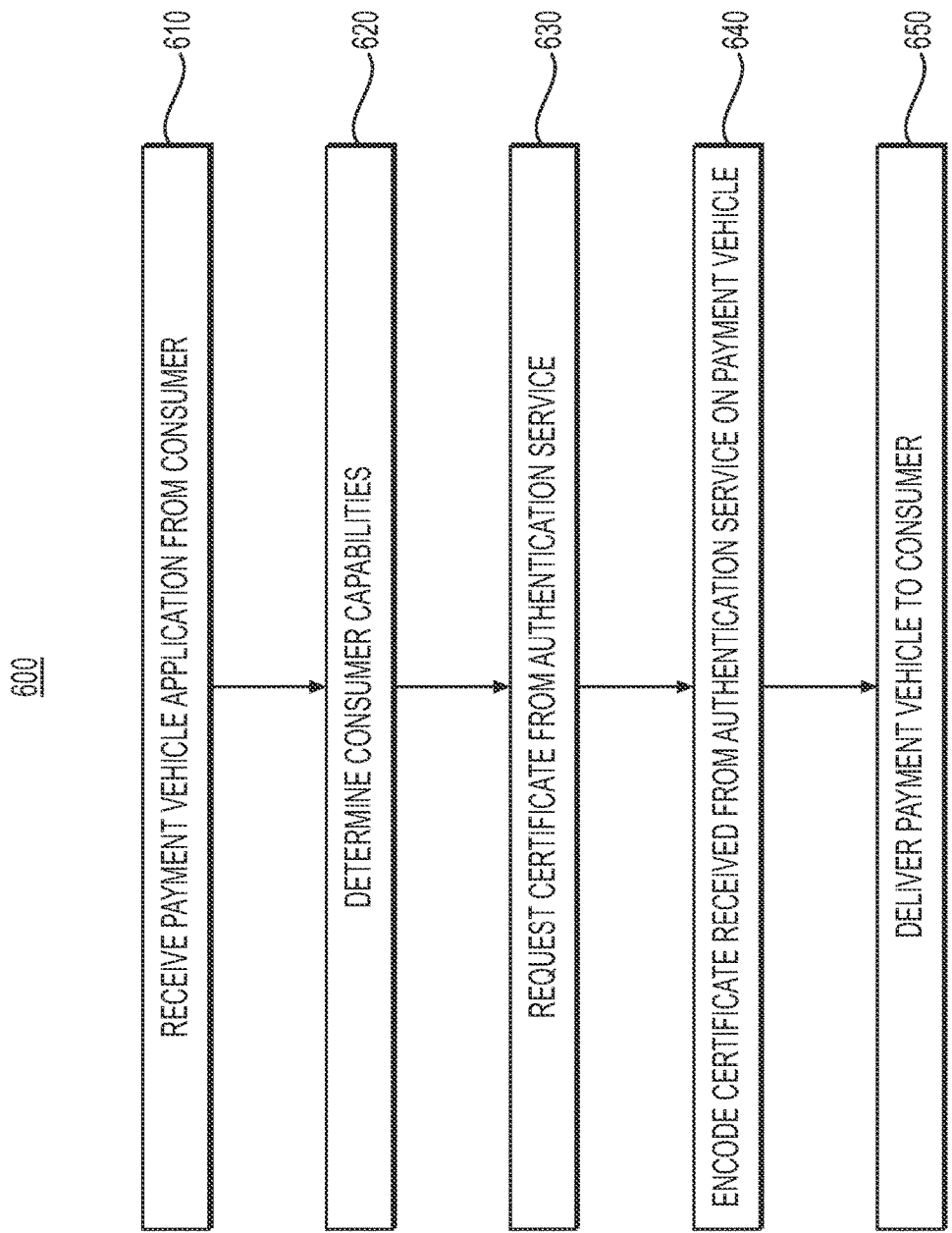
FIG. 6 is a flow chart depicting an example process for delivering an authenticated payment vehicle to a consumer, according to one or more embodiments.

As discussed above with respect to FIG. 2, communication between POS terminal 112 and financial institution 140 may include one or more authentication certificates 300 pertaining to, for example, payment vehicle 220, POS terminal 112, and financial institution 140. FIGS. 5 and 6 depict methods for associating authentication certificates 300 with payment vehicle 220 and POS terminal 112, according to one or more embodiments, in order to support such communication.

FIG. 5 is a flow chart depicting an example process for delivering an authenticated payment device, such as POS terminal 112, to a merchant, according to one or more embodiments. Once received by the merchant, the authenticated payment device may be used by the merchant to submit payment transaction requests directly to a financial institution. In step 510, POS terminal manufacturer 4108 may receive a POS terminal request from merchant 110. The POS terminal request may include merchant capabilities 418. In step 520, POS terminal manufacturer 4108 may request authentication certificate 300 from authentication service 210. In step 530, POS terminal manufacturer 4108 may encode authentication certificate 300 received from authentication service 210 on POS terminal 112. In step 540, POS terminal manufacturer 4108 may deliver POS terminal 112 to merchant 110. Once received by the merchant, the authenticated payment device may be used by the merchant to submit payment transaction requests directly to a financial institution.

FIG. 6 is a flow chart depicting an example process for delivering an authenticated payment vehicle, such as payment vehicle 220, to a consumer, such as consumer 102, according to one or more embodiments. In step 610, payment vehicle issuer 410A may receive a payment vehicle application from consumer 102. In step 620, payment vehicle issuer 410A may determine consumer capabilities for consumer 102. In step 630, payment vehicle issuer 410A may request authentication certificate 300 from authentication service 210. In step 640, payment vehicle issuer 410A may encode authentication certificate 300 received from authentication service 210 on payment vehicle 220. In step 650, payment vehicle issuer 410A may deliver payment vehicle 220 to consumer 102. Once received by the consumer, the authenticated payment vehicle may be used by the consumer at a participating merchant to submit payment transaction requests directly to a financial institution.

Figure 7:
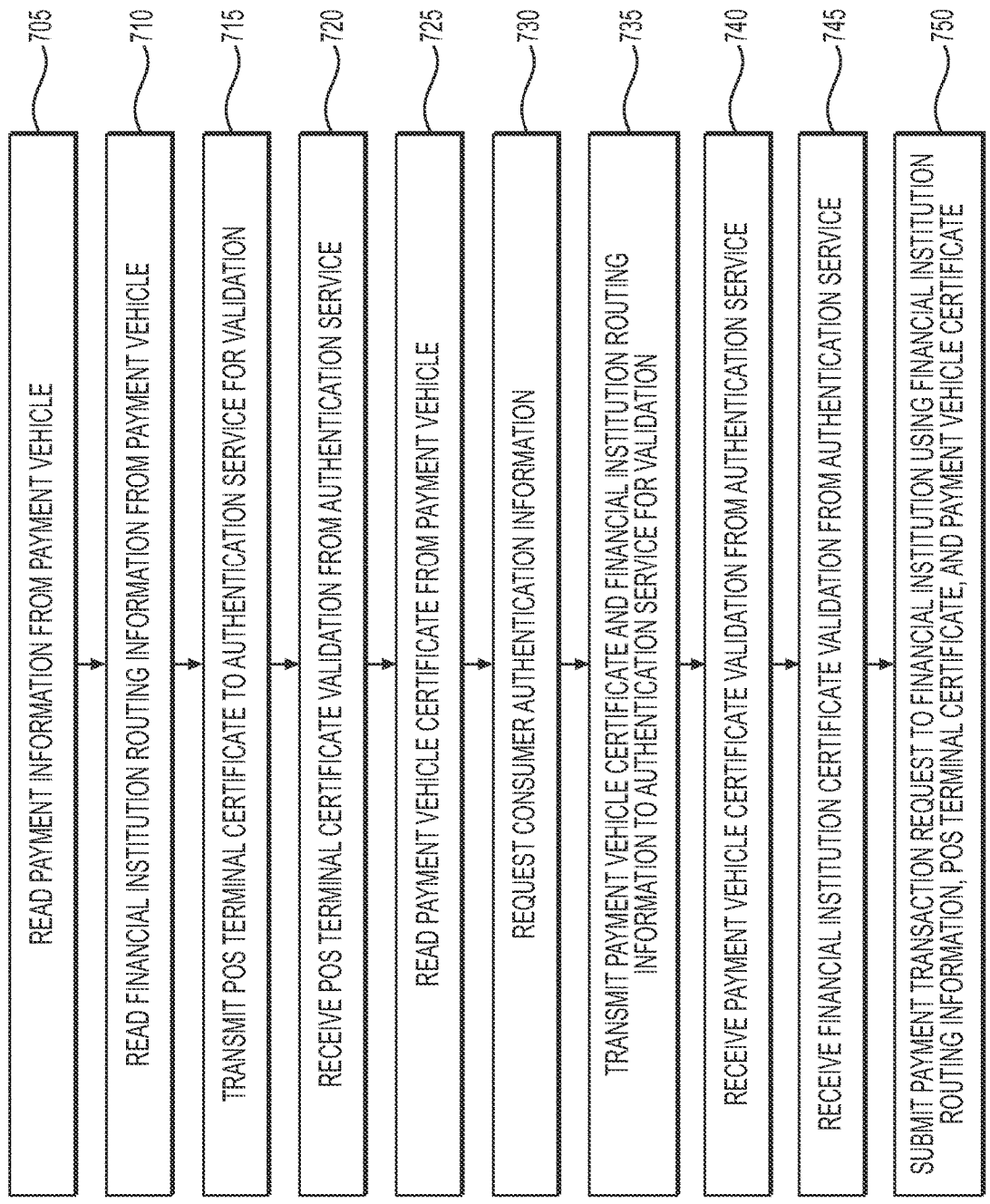
FIG. 7 is a flow chart depicting an example process for payment transaction request submissions, according to one or more embodiments.

When an authenticated payment device and/or an authenticated payment vehicle are available for submitting a payment transaction request, the request may be submitted directly to a financial institution. FIG. 7 is a flow chart depicting an example process for payment transaction request submissions, according to one or more embodiments. In step 705, POS terminal 112 may read payment information from payment vehicle 220. In step 710, POS terminal 112 may read financial institution routing information from payment vehicle 220. In step 715, POS terminal 112 may transmit POS terminal certificate 300 to authentication service 210 for validation. In step 720, POS terminal 112 may receive a POS terminal certificate validation for POS terminal certificate 300 from authentication service 210. In step 725, POS terminal 112 may read payment vehicle certificate 300 from payment vehicle 220. In step 730, POS terminal 112 may request consumer authentication information from consumer 102. In step 735, POS terminal 112 may transmit payment vehicle certificate 300 and the financial institution routing information to authentication service 210 for validation. In step 740, POS terminal 112 may receive a payment vehicle certificate validation for payment vehicle certificate 300 from authentication service 210. In step 745, POS terminal 112 may receive a financial institution certificate validation for financial institution certificate 300 from authentication service 210. In step 750, POS terminal 112 may submit a payment transaction request to financial institution 140 using the financial institution routing information, POS terminal certificate 300, and payment vehicle certificate 300.

Figure 8:
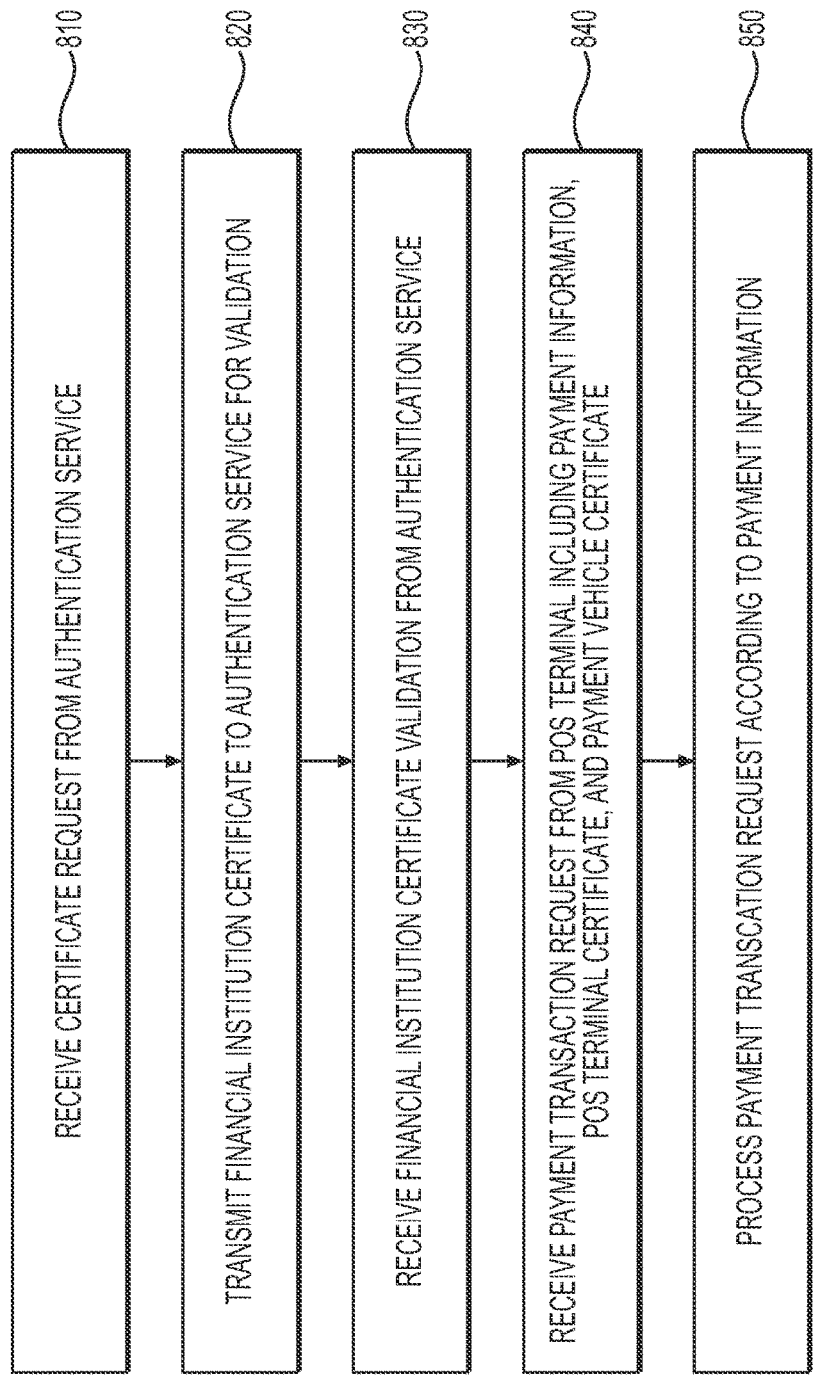
FIG. 8 is a flow chart depicting an example process for processing a payment transaction request at a financial institution, according to one or more embodiments.

A financial institution may receive a payment transaction request from an authenticated POS terminal. The request may be include information from an authenticated payment vehicle. FIG. 8 is a flow chart depicting an example process for processing a payment transaction request at a financial institution, according to one or more embodiments. In step 810, financial institution 140 may receive a request for financial institution certificate 300 from authentication service 210. In step 820, financial institution 140 may transmit financial institution certificate 300 to authentication service 210 for validation. In step 830, financial institution 140 may receive a financial institution certificate validation of financial institution certificate 300 from authentication service 210. In step 840, financial institution 140 may receive a payment transaction request from POS terminal 112 including payment information, POS terminal certificate 300, and payment vehicle certificate 300. In step 850, financial institution 140 may process the payment transaction request according to the received payment information.

Figure 9:
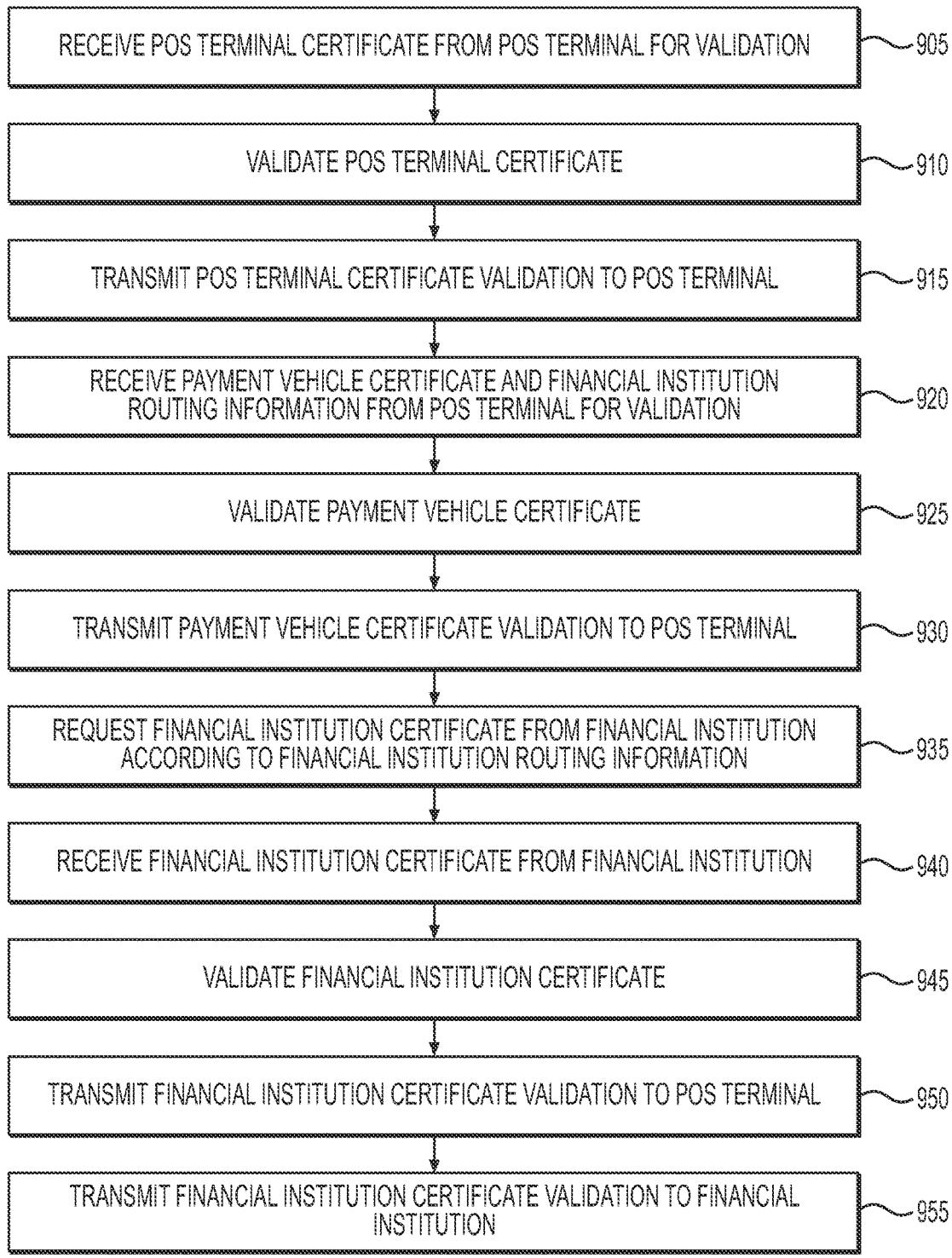
FIG. 9 is a flow chart depicting an example process for processing a payment transaction request through an authentication service, according to one or more embodiments.

A payment transaction request submitted directly to a financial institution may include information about an authenticated POS device, an authenticated payment vehicle, and an authenticated financial institution. An authentication service may be provided to authenticate the POS device, the payment vehicle, and the financial institution. FIG. 9 is a flow chart depicting an example process for processing a payment transaction request through an authentication service, according to one or more embodiments. In step 905, authentication service 210 may receive POS terminal certificate 300 from POS terminal 112 for validation. In step 910, authentication service 210 may validate POS terminal certificate 300. In step 915, authentication service 210 may transmit a POS terminal certificate validation for POS terminal certificate 300 to POS terminal 112. In step 920, authentication service 210 may receive payment vehicle certificate 300 and financial institution routing information from POS terminal 112 for validation. In step 925, authentication service 210 may validate payment vehicle certificate 300. In step 930, authentication service 210 may transmit a payment vehicle certificate validation payment vehicle certificate 300 to POS terminal 112. In step 935, authentication service 210 may request financial institution certificate 300 from financial institution 140 according to the provided financial institution routing information. In step 940, authentication service 210 may receive financial institution certificate 300 from financial institution 140. In step 945, authentication service 210 may validate financial institution certificate 300. In step 950, authentication service 210 may transmit a financial institution certificate validation for financial institution certificate 300 to POS terminal 112. In step 955, authentication service 210 may transmit a financial institution certificate validation for financial institution certificate 300 to financial institution 140.

A merchant submitting payment transaction requests according to traditional methods may encounter processing delays and fees from various intermediaries involved in the transaction. These intermediaries may include acquirer processors who process the payment transactions and settle funds between consumers' and merchants' accounts. In the early history of payment transaction processing, such intermediaries were necessary because of the limited communication and data processing capabilities available to most merchants. However, modern communication and data processing capabilities make it possible for merchants to more readily connect to financial institutions directly. Thus, a merchant submitting payment transaction requests by the methods disclosed herein may achieve savings in reduced processing delays and/or avoided processing fees.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method for a direct submission of a payment transaction request from a point of sale (POS) terminal to a transaction server of a financial institution, the method comprising:
    reading, by the POS terminal, payment information from a payment vehicle; and
    transmitting, by the POS terminal and directly to the transaction server of the financial institution over a network, the payment transaction request including the payment information, a POS terminal certificate, and a payment vehicle certificate.

2. The method of claim 1, further comprising:
    reading, by the POS terminal, financial institution routing information from the payment vehicle.

3. The method of claim 1, further comprising:
    transmitting, by the POS terminal, the POS terminal certificate to an authentication service for validation.

4. The method of claim 1, further comprising:
    reading, by the POS terminal, the payment vehicle certificate from the payment vehicle.

5. The method of claim 1, further comprising:
    requesting, by the POS terminal, consumer authentication information from a consumer associated with the payment vehicle.

6. The method of claim 1, further comprising:
    transmitting, by the POS terminal, the payment vehicle certificate and financial institution routing information to an authentication service for validation.

7. The method of claim 1, wherein the POS terminal certificate stores data defining one or more capabilities of a merchant associated with the POS terminal, and wherein the payment vehicle certificate stores data defining one or more capabilities of a consumer associated with the payment vehicle.

8. A point of sale (POS) terminal comprising:
    a memory configured to store instructions; and
    one or more processors configured to execute the instructions to perform operations comprising:
    reading payment information from a payment vehicle; and
    transmitting, directly to the transaction server of the financial institution over a network, the payment transaction request including the payment information, a POS terminal certificate, and a payment vehicle certificate.

9. The device of claim 8, wherein the operations further comprise:

reading financial institution routing information from the payment vehicle.

10. The device of claim 8, wherein the operations further comprise:
   transmitting the POS terminal certificate to an authentication service for validation.

11. The device of claim 8, wherein the operations further comprise:
   reading the payment vehicle certificate from the payment vehicle.

12. The device of claim 8, wherein the operations further comprise:
   requesting consumer authentication information from a consumer associated with the payment vehicle.

13. The device of claim 8, wherein the operations further comprise:
   transmitting the payment vehicle certificate and financial institution routing information to an authentication service for validation.

14. The device of claim 8, wherein the POS terminal certificate stores data defining one or more capabilities of a merchant associated with the POS terminal, and wherein the payment vehicle certificate stores data defining one or more capabilities of a consumer associated with the payment vehicle.

15. A non-transitory computer-readable medium storing instructions that, when executed by one or more processors of a point of sale (POS) terminal, cause the one or more processors to perform operations comprising:
   reading payment information from a payment vehicle; and
   transmitting, directly to the transaction server of the financial institution over a network, the payment transaction request including the payment information, a POS terminal certificate, and a payment vehicle certificate.

16. The non-transitory computer-readable medium of claim 15, wherein the operations further comprise:
   reading financial institution routing information from the payment vehicle.

17. The non-transitory computer-readable medium of claim 15, wherein the operations further comprise:
   transmitting the POS terminal certificate to an authentication service for validation.

18. The non-transitory computer-readable medium of claim 15, wherein the operations further comprise:
   reading the payment vehicle certificate from the payment vehicle.

19. The non-transitory computer-readable medium of claim 15, wherein the operations further comprise:
   requesting consumer authentication information from a consumer associated with the payment vehicle.

20. The non-transitory computer-readable medium of claim 15, wherein the operations further comprise:
   transmitting the payment vehicle certificate and financial institution routing information to an authentication service for validation.

* * * * *